Dec. 26, 1939.  R. J. BRITTAIN, JR  2,184,578
AXLE AND HOUSING CONSTRUCTION
Filed Sept. 29, 1937   3 Sheets-Sheet 1
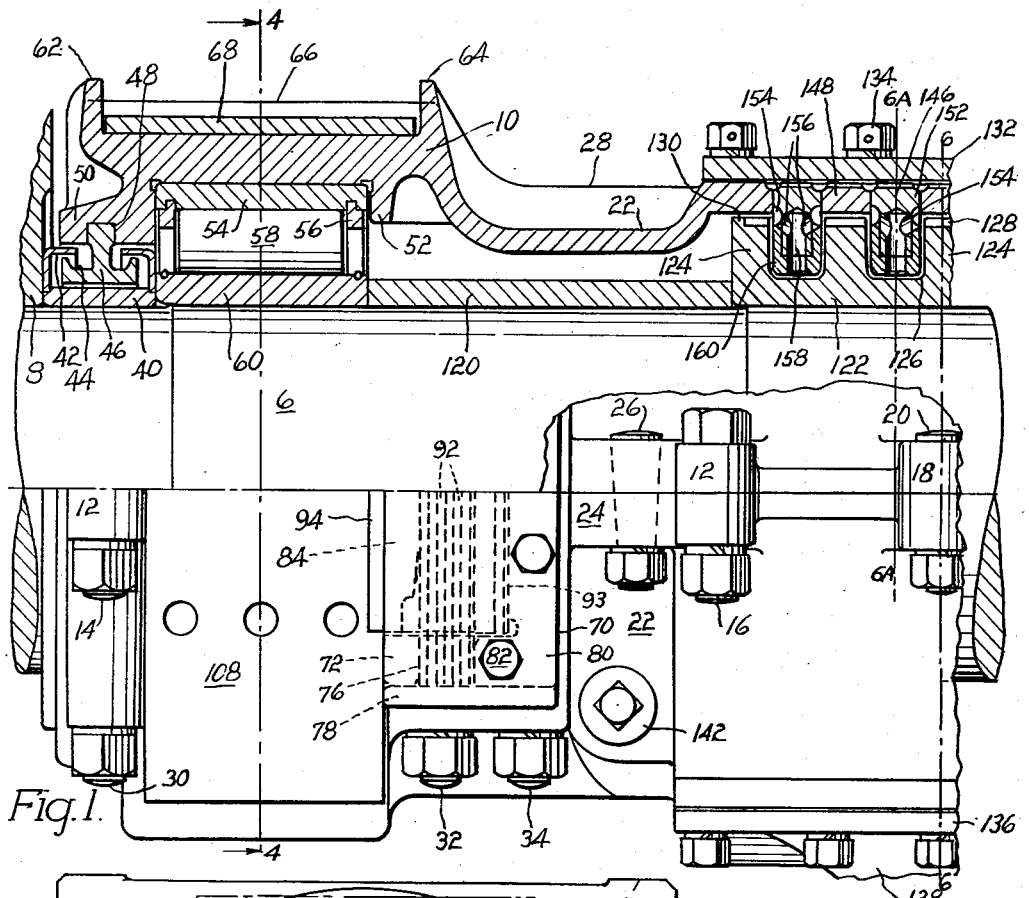
INVENTOR:
RICHARD J. BRITTAIN, JR.
BY Gales P. Moore
HIS ATTORNEY.

INVENTOR:
RICHARD J. BRITTAIN, JR.
BY Gale P. Moore
HIS ATTORNEY.

Dec. 26, 1939.  R. J. BRITTAIN, JR  2,184,578
AXLE AND HOUSING CONSTRUCTION
Filed Sept. 29, 1937   3 Sheets-Sheet 3

INVENTOR:
RICHARD J. BRITTAIN JR.
BY Gales P. Moore
HIS ATTORNEY.

Patented Dec. 26, 1939

2,184,578

UNITED STATES PATENT OFFICE 2,184,578

AXLE AND HOUSING CONSTRUCTION

Richard J. Brittain, Jr., Bloomfield, N. J., assignor to General Motors Corporation, Detroit, Mich., a corporation of Delaware Application September 29, 1937, Serial No. 166,274

9 Claims. (Cl. 105—80)

This invention relates to axle and housing construction and comprises all of the features of novelty herein disclosed. An object of the invention is to provide improved means for yieldingly transmitting lateral thrust forces between an axle housing and a car frame.

To these ends and also to improve generally upon devices of this character, the invention consists in the various matters hereinafter described and claimed. In its broader aspects, the invention is not necessarily limited to the specific construction selected for illustrative purposes in the accompanying drawings in which Fig. 1 is a side elevation of one half of an axle housing, a portion of the housing being broken away to show parts in vertical section.

Fig. 2 is an end view of a thrust plate with a portion broken away and in section.

Fig. 3 is an enlarged sectional view on the line 3—3 of Fig. 2.

Figure 4:
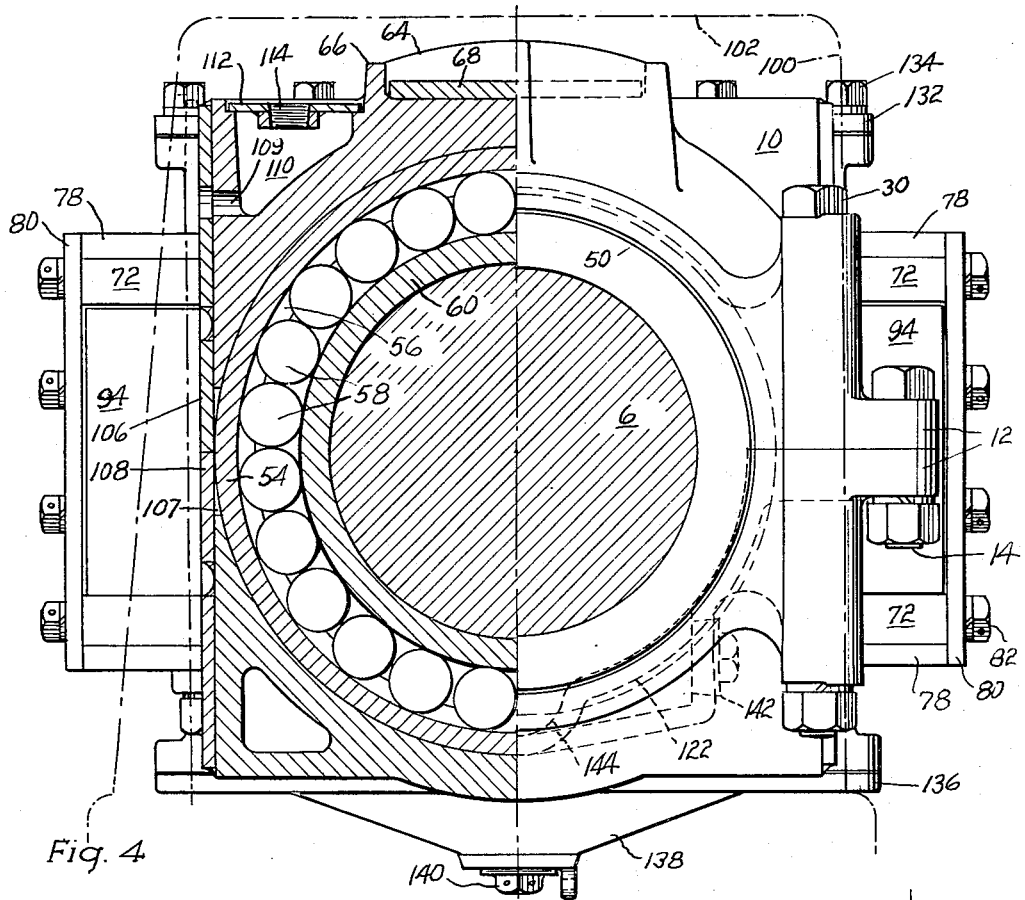
Fig. 4 is one half an end view of the axle housing and one half a sectional view on line 4—4 of Fig. 1.
Figure 5:
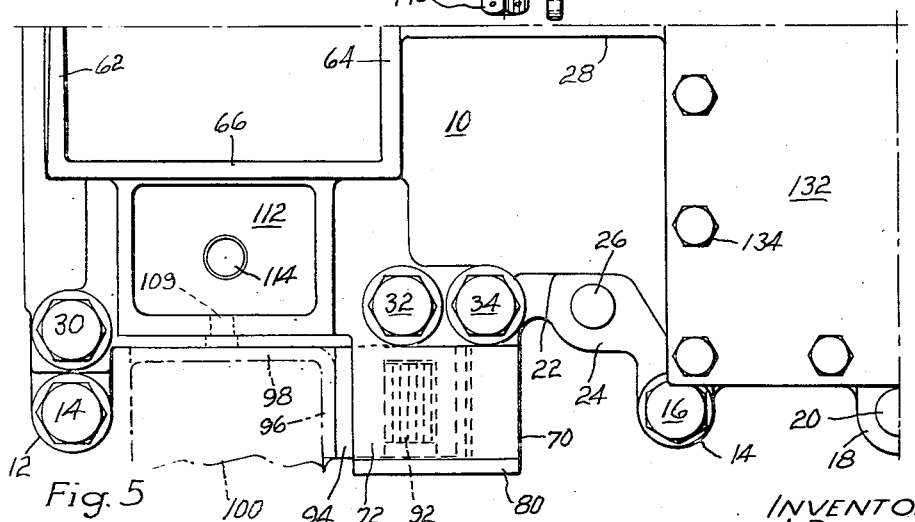
Fig. 5 is a plan view of a portion of the axle housing.
Figure 6:
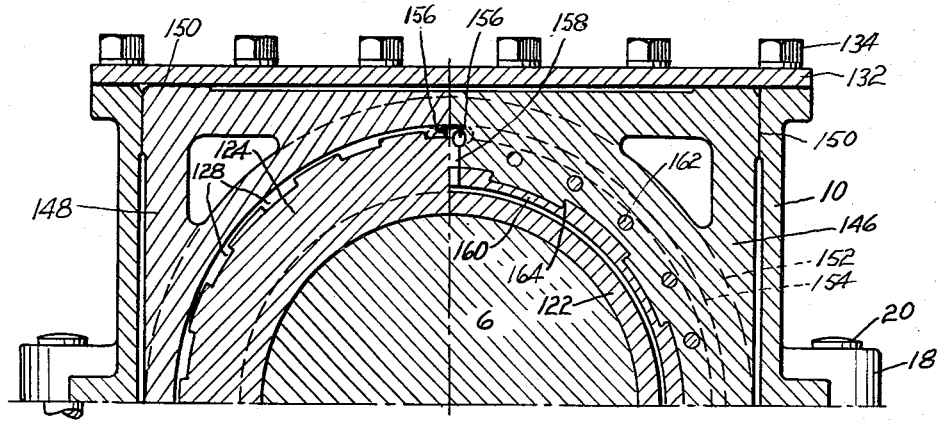
Fig. 6 is a cross sectional view, the left half of the figure being a section on the line 6—6 and the right half being a parallel section on line 6A—6A of Fig. 1.

The numeral 6 indicates a rotary shaft or axle to each end of which a wheel hub 8 is fixedly secured. The axle passes lengthwise through an axle box or housing 10 which is made in upper and lower sections to divide it upon the horizontal for easy assembly around the axle. The housing is symmetrical about a vertical transverse plane and about a vertical longitudinal plane and is square or rectangular in cross section for the most part. The upper and lower sections are provided with projecting lugs 12 which are secured together by bolts 14 and 16. Near the middle, there are additional mating lugs 18 for tapered securing bolts 20 which act to center the sections as well as to clamp them. At each side of the middle, the housing sections are necked in as at 22 and provided with mating lugs 24 for additional tapered bolts 26. The necked-in portion is reinforced at the top by a rib 28. The housing sections are further clamped together by long bolts 30, 32 and 34.

Next to each wheel hub 8, a sleeve 40 is secured on the axle. Flanged shields are secured to the sleeve and the flanges 42 project toward one another to surround grooves 44 formed in axial projections of a ring 46 which enters a channel 48 in an end flange 50 of the housing 10. The shields are intended to exclude water from the housing and to retain bearing lubricant. Between the end flange 50 and an internal flange 52, an antifriction bearing is mounted. It comprises an outer race ring 54 having end rings 56 to guide a series of rollers 58. The rollers run on an inner race ring 60 secured to the axle. On the top of the housing near each end, a seating recess is formed by end ribs 62 and 64 and side ribs 66, the recess receiving a seat plate 68 upon which rests the usual spring saddle (not shown).

Locomotive driving wheels are of large diameter and transmit very heavy thrust and twisting forces to the axle, as when the wheels travel on curves or uneven track. The present invention absorbs the shock of thrust forces while providing for limited lateral motion of the axle and the housing with respect to the frame.

Figure 7:
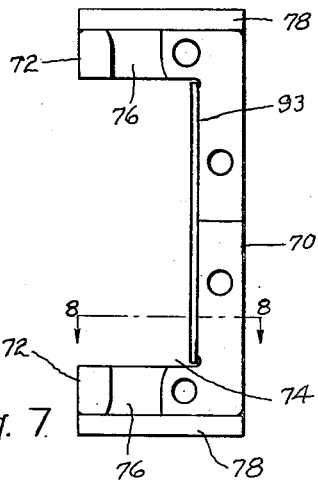
Fig. 7 is a side view of a pedestal flange.
Figure 9:
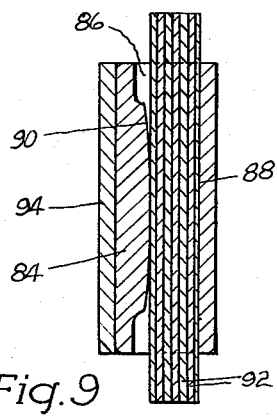
Fig. 9 is a vertical sectional view of a block and a leaf spring.
Figure 8:
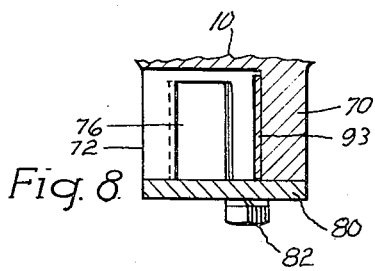
Fig. 8 is a section on the line 8—8 of Fig. 7.
Figure 10:
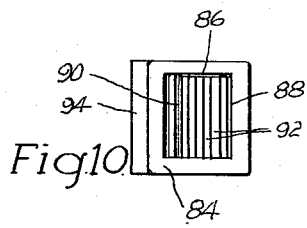
Fig. 10 is a plan view of Fig. 9.

Near each end of the housing and at each side is a socketed pedestal flange, Figs. 7 and 8. Each flange comprises an upright portion 70 and horizontal arms 72 forming a recess or socket 74. Each arm has a vertical notch 76 the vertical sides of which are crowned, the ends of the notches being closed by upper and lower plates 78 welded on and reinforcing the structure. The sides of the notches are closed by removable side plates 80 secured by screw bolts 82. In each socket is slidably supported a yieldable pedestal engaging member or block 84 having a vertical hole 86 whose rear wall 88 may be straight and whose front wall 90 is relieved at the ends and vertically crowned in its central region. Passing through the hole is a series of separate leaf springs 92 whose ends are received in the notches 76 and supported on the bottom plate 78. One or more of the springs is thinner than the others so that a proper total thickness can be selected to substantially fill the hole 86 and the notches 76. The crowned surfaces provide extended and shiftable bearing surfaces for the springs to facilitate flexing of the latter. The block 84 and the springs are inserted in the socket 74 and in notch 76 from one side when the side plate 80 is removed. One or more shims 93 may be inserted in the socket 74 to adjustably limit the sliding of block 84.

Welded to the block 84 and projecting from the socket is a wear plate 94 adapted to engage a flange 96 on an angular wear plate 98 which is welded to the usual pedestal leg 100. Such pedestal legs usually project downwardly from a car frame member 102 which clears the top of the housing, there being vertical movement of the pedestal legs along the sides of the housing as well as lateral movement when the car wheels traverse curves or uneven track. The thrust forces lengthwise of the axle are transmitted to the block 84 which yieldingly resists any movement tending to slide it deeper into its socket 74.

The sides of the housing next to the angular wear plate 98 are lined with wear plates 106 and 108 which are welded on, the wear plates closing an opening 107 in the housing, this opening providing a space to accommodate the sides of the outer race ring 54 of the antifriction bearing. Thus the bearing can be made nearly as large as the standard distance between pedestal legs. The upper liner 106 has a hole which registers with a hole 109 communicating with a lubricant cavity 110 in the corner of the housing. The cavity is closed by a plate 112 having a plug in a threaded opening 114 which is adapted to receive a pressure fitting for lubrication.

The means for yieldingly resisting axial or lateral thrust forces between the housing and the frame is described above. These forces are transmitted from the wheeled axle to the housing in the manner now described. Sleeves 120 space the bearing inner race rings 60 from a central thrust sleeve 122 having a series of round thrust collars 124 with intervening grooves 126. The collars have their peripheries formed with a series of lugs alternating with notches 128 to elevate lubricant, the endmost collar having a continuous side rib 130 to close the notches on one side. That part of the housing enclosing the thrust collars is substantially square in external outline and has an upper opening extending transversely across it and provided with a cover 132 removably secured by screw bolts 134. A similar bottom opening is closed by a removable cover 136 having a sump 138 with a drain plug 140. Lubricant is maintained in the housing at the level of the center of the lowermost roller 58 and is supplied at a plugged opening 142 to the necked-in portion 22 of the housing. This portion of the housing is generally round but has a bulged portion 144 at the bottom to provide a communicating lubricant passage between the roller bearing and the thrust collars 124 so that the latter will dip into the lubricant.

Thrust plates 146 alternating with spacing plates 148 are inserted in the square central portion of the housing, the plates being made in sections for assembly from above and below when the covers 132 and 136 are removed. The plates are externally square-cornered as indicated at 150 to fit the interior of the housing, the upper and lower edges projecting into the openings of the housing, and the assembled series of plates being confined by the walls of the opening against movement lengthwise of the housing. The spacing plates 148 are internally round and of a size to surround the thrust collars 124. The thrust plates are also internally round but much deeper to enter the grooves 126 between the thrust collars. The thrust plates have short axially projecting circular flanges 152 to abut against the spacing plates and, inside of each flange 152, is a circular groove 154 adapted to receive lubricant from the notches or buckets 128 and deliver it to inclined ports 156 in the thrust plates.

The ports 156 communicate with radial ports 158 which deliver the lubricant to the grooves 126. At each side of each thrust plate, there are two of the inclined ports 156 for each radial port 158, the ports 156 converging from the groove 154 into the same radial port so that lubricant will be thrown in, in either direction of axle rotation. The sides of the thrust plates are lined with babbitt as indicated at 160 to engage the thrust collars 124 when the axle shifts endwise in either direction. The babbitt is cast through holes 162 and in dovetailed grooves 164 in the thrust plates. The port 158 is shown at the top with two adjacent ports 156 inclined into it but similar additional ports may be provided at other locations.

In operation, as the axle rotates rapidly in either direction, lubricant is picked up by the thrust collars 124 and thrown into the ports in the thrust plates 146. The lubricant flows by gravity from the port 158 into the grooves 126 and works outwardly between the thrust collars and the thrust plates to lubricate the engaging surfaces when the axle shifts endwise. At low speed of the axle, lubricant will be elevated and flow down the sides of the thrust collars from the notches 128. In either case, the endwise thrust forces between the wheeled axle and the housing are resisted by thoroughly lubricated surfaces. The endwise thrust forces between the housing and the pedestal legs are yieldingly resisted by the sliding blocks 84.

I claim:

1. In a device of the character described, a frame having a pedestal, an axle housing having a pedestal flange with a socket open towards the pedestal, a block shiftable laterally in the socket, upper and lower arms on the pedestal flange for guiding and supporting the block, the arms having notches open to the side, and a leaf spring having its middle portion engaging the block and its end portions projecting beyond the block and adapted for lateral entry into the open notches of the arms; substantially as described.

2. In a device of the character described, a frame having a pedestal, an axle housing having a pedestal flange with an upright portion and laterally extending arms forming a socket open towards the pedestal, a block shiftable laterally in the socket, the arms having vertically extending notches, and a leaf spring having its middle portion engaging the block and its end portions extending beyond the block and entering the notches in the arms; substantially as described.

3. In a device of the character described, a frame having a pedestal, an axle housing having a pedestal flange with an upright portion and laterally extending arms forming a socket open towards the pedestal, the arms having vertically extending notches open to the side, a block shiftable laterally in the socket, a leaf spring engaging the block and having its end portions entering the notches, and a side plate detachably secured to the pedestal flange and closing the notches; substantially as described.

4. In a device of the character described, a frame having a pedestal, an axle housing having a pedestal flange with an upright portion and laterally extending arms forming a socket open towards the pedestal, the arms having vertically extending notches open to the side, a block shiftable laterally in the socket, a leaf spring engaging the block and having its end portions entering the notches, a side plate detachably secured to the pedestal flange and closing the sides of the notches and the socket, and a plate secured to the lower arm and supporting the lower end of the spring; substantially as described.

5. In a device of the character described, a frame having a pedestal, an axle housing having a pedestal flange with an upright portion and laterally extending arms forming a socket open towards the pedestal, a block shiftable laterally in the socket, means for yieldingly resisting shifting of the block, and a plate detachably secured to the flange to close the side of the socket; substantially as described.

6. In a device of the character described, a frame having a pedestal, an axle housing having a pedestal flange with an upright portion and laterally extending arms forming a socket open towards the pedestal, a block shiftable laterally in the socket, means for yieldingly resisting shifting of the block, and means insertable in the socket to adjustably limit the shifting of the block; substantially as described.

7. In a device of the character described, a frame having a pedestal, an axle housing having a pedestal flange with an upright portion and laterally extending arms forming a socket open towards the pedestal, the arms having vertically extending notches with crowned edges, a block shiftable laterally in the socket, and a spring engaging the block and having its end portions engaging the crowned edges of the notches; substantially as described.

8. In a device of the character described, a frame having a pedestal, an axle housing having a pedestal flange with a socket open towards the pedestal, a block shiftable laterally in the socket and having a wall vertically crowned, and a leaf spring having its middle portion engaging said wall and its end portions in engagement with the flange; substantially as described.

9. In a device of the character described, a frame having a pedestal, an axle housing having a pedestal flange, a block shiftable laterally of the flange and having a crowned abutment wall, the flange having crowned portions above and below the block, and a leaf spring having its middle portion engaging the crowned wall of the block and having its end portions in engagement with the crowned portion of the flange; substantially as described.

RICHARD J. BRITTAIN, Jr.